United States Patent [19]

Kolb, III

[11] Patent Number: 5,513,529
[45] Date of Patent: May 7, 1996

[54] HOUSING ASSEMBLY FOR FLOW METER

[75] Inventor: William J. Kolb, III, Zion, Ill.

[73] Assignee: Liquid Controls Corporation, Lake Bluff, Ill.

[21] Appl. No.: 470,189

[22] Filed: Jun. 6, 1995

Related U.S. Application Data

[63] Continuation-in-part of Ser. No. 712,332, Jun. 7, 1991, abandoned.

[51] Int. Cl.$^6$ .................................................. G01F 3/00
[52] U.S. Cl. .................................................. 73/253
[58] Field of Search ............................ 73/253, 254, 255, 73/256, 257, 258, 259, 260, 261; 418/169, 170

[56] References Cited

U.S. PATENT DOCUMENTS

| | | | |
|---|---|---|---|
| 3,255,630 | 6/1966 | Karlby et al. | 73/253 |
| 3,304,781 | 2/1967 | Stevenson | 73/253 |
| 3,842,672 | 10/1974 | Schneider, Jr. | 73/253 |
| 4,478,079 | 10/1984 | Hicks et al. | 73/253 |
| 4,479,384 | 10/1984 | Jacobsen | 73/253 |
| 4,481,812 | 11/1984 | Hicks | 73/253 |
| 4,487,064 | 12/1984 | Hicks | 73/253 |
| 4,534,227 | 8/1985 | Petit | 73/253 |
| 5,150,612 | 9/1992 | Lew | 73/253 |
| 5,257,919 | 11/1993 | Lew | 73/259 |

Primary Examiner—Richard Chilcot
Assistant Examiner—Ronald Biegel
Attorney, Agent, or Firm—Patnaude, Videbeck & Marsh

[57] ABSTRACT

An improved industrial meter housing assembly includes a compactly designed metal housing having a central trefoil shaped chamber and minimal length inlet and outlet ports in fluid communication with the chamber with the ports ending at inlet and outlet port faces on the housing outer surface oriented 90°degrees from each other and 45°degrees to the vertical with the housing in its upright position. The housing may be installed as original equipment in an industrial environment having upstream pipe connections provided to match those input and output port faces. However, the compactness of the housing may be utilized together with a pair of installations-specific inlet and outlet runner pipes to enable the combination meter housing/runners to be substituted for any existing original equipment industrial meter. Additionally, the inlet and outlet ports of the compact meter housing are shaped to match the width and radius (area) of the displacement rotors, and the inlet and outlet runner pipe passageways are shaped to provide a smooth transition from the circular cross-section inlet and outlet fluid transmission pipes to the generally rectangular inlet and outlet port configurations. Further, the short inlet and outlet ports in the housing are curved to direct the fluid flow in a less turbulent manner to and from the displacement rotors rather than directing the fluid flow to and from the blocking rotor or between the blocking rotor and the displacement rotors.

4 Claims, 6 Drawing Sheets

HOUSING ASSEMBLY FOR FLOW METER

This application is a continuation-in-part of application Ser. No. 07/712,332, filed Jun. 7, 1991 and now abandoned.

BACKGROUND OF THE INVENTION

This invention relates to improvements in positive displacement fluid flow meters, and more particularly, to a combination reduced size meter housing and variable configuration inlet and outlet runners therefor.

Industrial fluid flow meters, such as those used in the petrochemical and liquified petroleum gas industries, are generally the reverse of a positive displacement pump. That is, the fluid, flowing through a commercial delivery system, whether it be a gasoline storage tank facility, gasoline transport truck, or other storage or delivery system, generally has a positive displacement meter connected in line in the fluid delivery system such that movement of fluid, whether gas or liquid, through the delivery line causes movement of the rotors in the meter which drives a mechanical or electrical counting device to precisely measure the movement of flow through the delivery system. A typical industrial meter is a plastic rotary fluid displacement meter suitable for use in the food industry is disclosed at U.S. Pat. No. 3,465,683.

In practice, when a chemical storage facility is constructed, a certain make of meters is chosen for use and the fluid delivery system is built around those meters. Likewise, when fluid transport trucks are built, the fluid delivery system constructed on the vehicle is engineered or designed to fit a specific make meter.

Generally, meters have a working life which is less than that of the installation or environment in which the meter is installed. Therefore, a meter in an industrial installation will ordinarily be replaced several times during the life of the storage or transport facility in which it is mounted. However, because of the specific construction of the environment in which it is mounted, the replacement meter must be of the same size as the meter that it replaces. Additionally, the orientation of the replacement meter must be such that the meter display is upright and readable when installed. Throughout industry it has been common for the replacement meters in these fluid storage facilities or transport vehicles to be the same make as the original equipment meter. Therefore, size and variability limitations of present day meters have not allowed the users to take advantage of increases in technology and longevity of life found in certain meters, when those installations did not originally have those specific meters engineered into them.

This lack of interchangeability of replacement meters in installations for which they were not originally designed is no more self-evident than found in differing world markets, and British and metric measuring systems such as between the United States and Europe or South America.

A need has developed for a combination industrial fluid-gas meter which is so reduced in size from presently known meters that meter and associated input and output ports can be made to match the location of the input and output ports of a variety of differing competing industrial fluid-gas meters.

A need has also developed for an industrial fluid-gas meter having increased efficiency of past design to reduce rotor shaft bearing load, and decrease slippage during phase transition of the displacement rotors.

It is, therefore, an object of the present invention, generally stated, to provide an improved fluid-gas meter assembly which is adaptable to fit in the space previously occupied by gas-fluid meters of differing designs having differing input and output port positions.

SUMMARY OF THE INVENTION

The invention resides in a rotary fluid displacement device of the type having a pair of displacement rotors and a blocking rotor mounted on shafts being rotatably mounted within a fluid chamber, and inlet and outlet ports in fluid communication with respective ones of the displacement rotors. The invention is found in an improvement wherein in one embodiment the inlet and outlet ports are shaped similarly to the swept area of the displacement rotor, and in another embodiment the length and height of a displacement rotor blade are substantially equal.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, wherein like reference numerals identify like elements throughout and in which:

DETAILED DESCRIPTION OF THE PREFERRED EMBODIMENT

Figure 1:
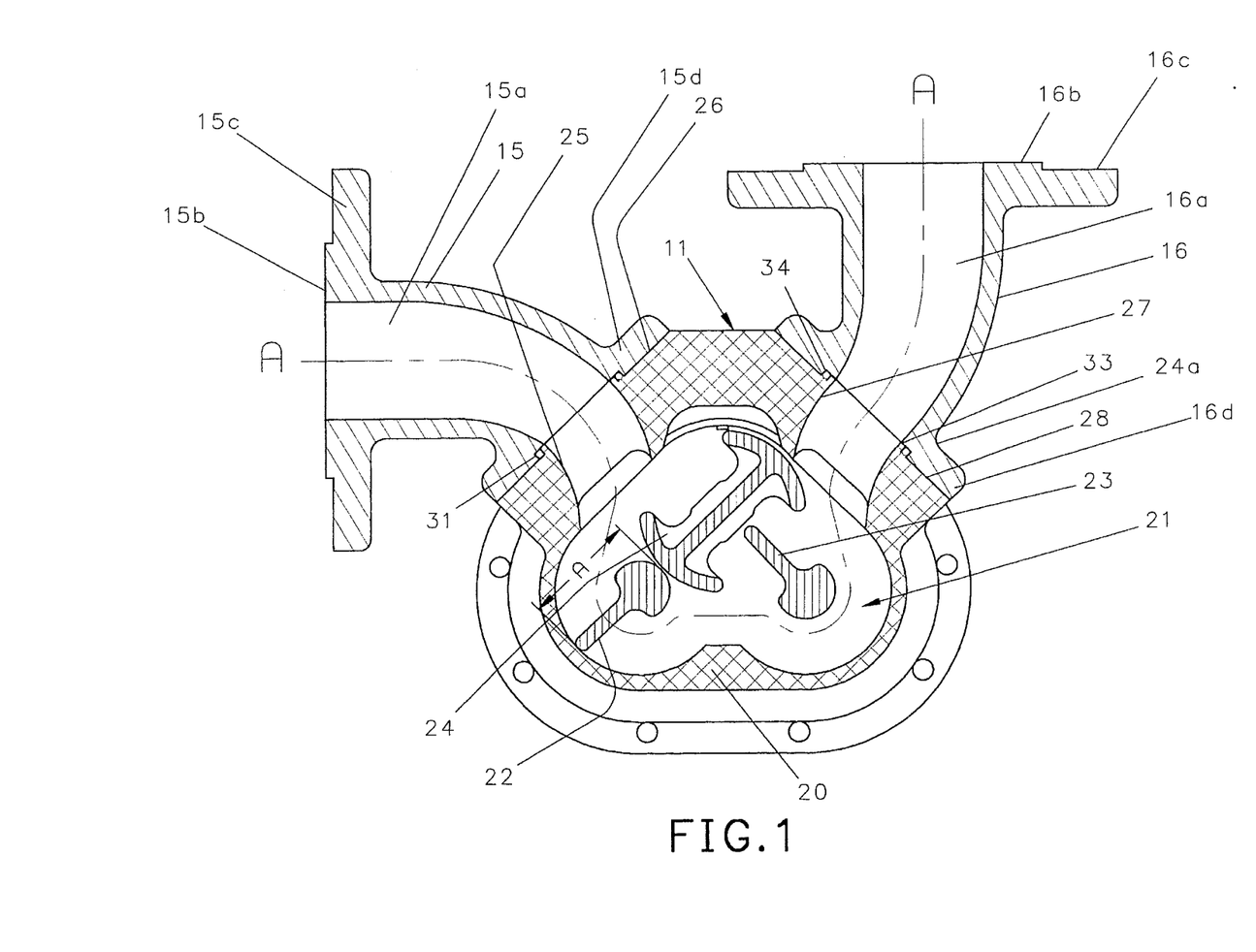
FIG. 1 is a vertical sectional view, constructed in accordance with the present invention, showing the improved combination housing structure and attachable inlet and outlet port runners.
Figure 2:
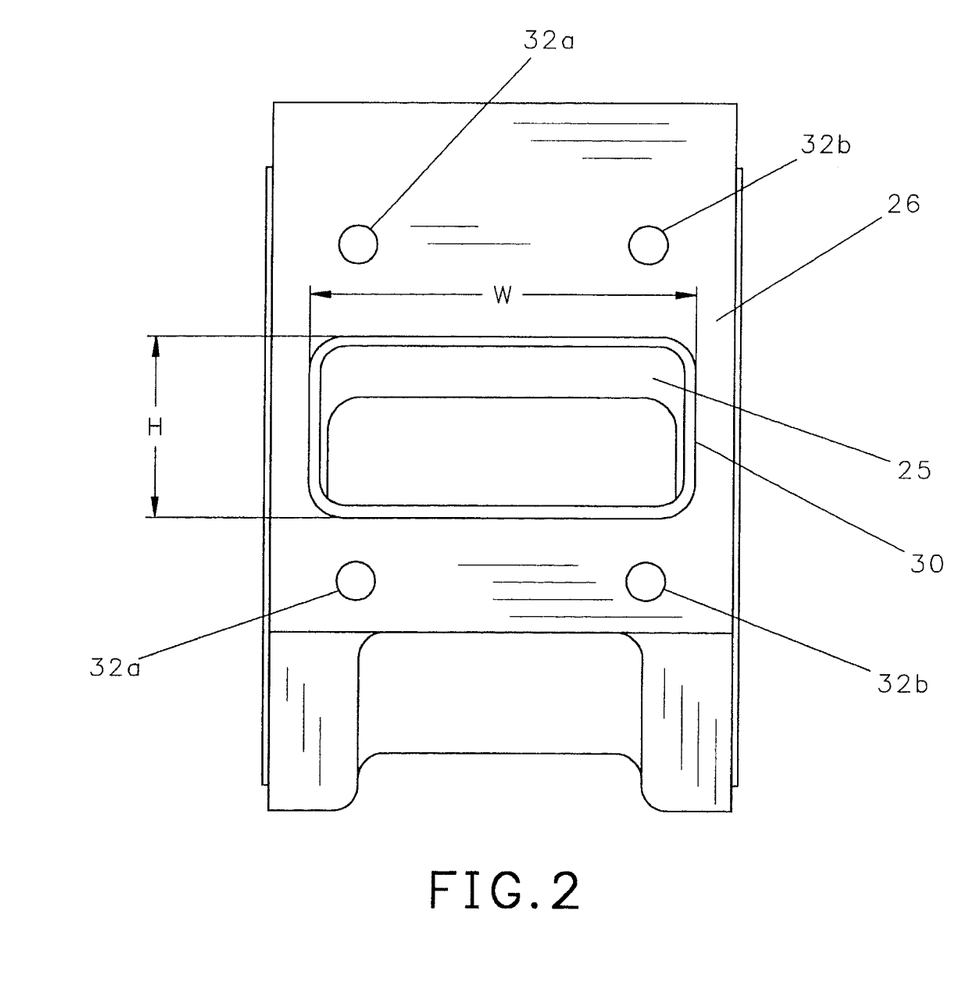
FIG. 2 is a detailed view of the meter housing input port shown in FIG. 1 taken parallel to the input port face thereof.
Figure 3:
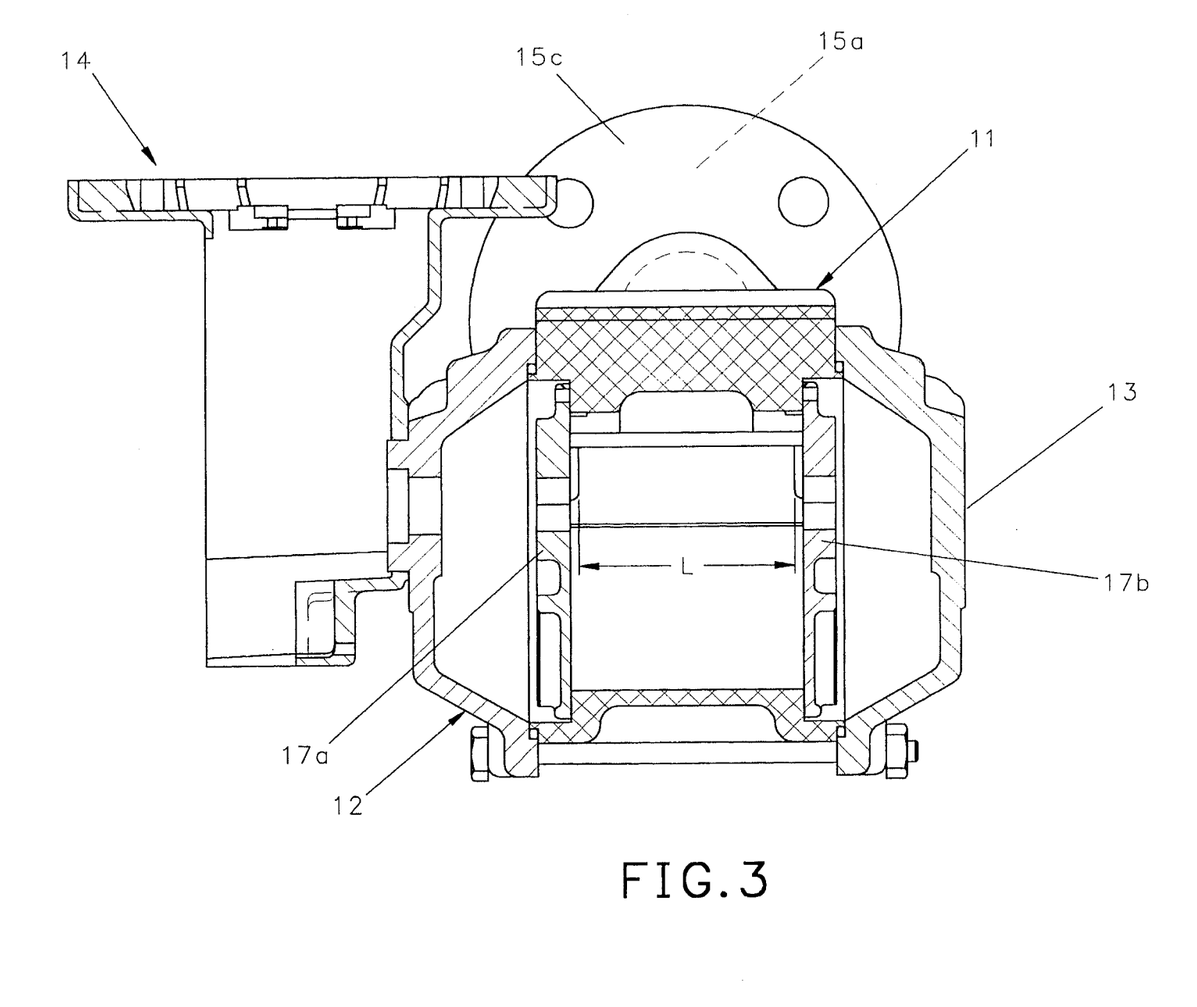
FIG. 3 is a vertical sectional view of the meter housing, end cap and display mounting.

Referring to FIGS. 1, 2 and 3, an industrial meter assembly 10, constructed in accordance with the present invention, includes a housing 11, front and rear end caps 12, 13, respectively, a meter readout display mounting 14, affixed to the front end cap 12, an inlet port runner 15 and an outlet port runner 16 mounted on housing 11 and adapted to precisely fit between the housing 11 and external fluid delivery lines (not shown). The meter further includes opposed rotor shaft mounting plates 17a and 17b respectively mounted on the front and back sides of housing 11. A readout display unit (not shown) is mounted on the top of display mounting 14.

Housing 11 is preferably made of but not limited to stainless steel, cast iron, aluminum, or brass, and has a generally triangularly or prismatic shaped outer wall 20 with an inner generally trefoil shaped cavity, generally indicated at 21, including a pair of displacement rotors 22, 23 and a blocking rotor 24, rotatably mounted therein on shafts axially aligned journals (not shown) positioned at each end of the displacement rotors and the blocking rotor, respectively. Each journal is rotatably bearingly mounted in rotor shaft mounting plates 17a and 17b respectively. An input port 25 extends through housing 11 from a position adjacent displacement rotor 22 outwardly to a substantially flat mounting face 26 on the outside of housing 11. Also, on the opposite side of housing 11, an outlet port 27 extends from a position adjacent the drive rotor 23 outwardly of the housing to a generally flat mounting face 28. In this embodiment, the mounting faces 26 and 28 are positioned at a 90 degree angle with respect to each other and are each 45 degrees with the vertical when the housing is in an upright position. The respective mounting faces 26 and 28 are positioned very close to the meter housing cavity 21 so as to provide both a compact housing assembly and to provide space for maximizing the lengths of the inlet port runner 15 and outlet port runner 16.

Referring to FIGS. 1 and 2, the mounting face 26 of inlet port 25 is a surface which is machined flat with the exception of a generally rectangular boss 30 immediately surrounding the rectangular inlet port 25 and extending outwardly thereof a small distance to provide for alignment and sealing of inlet port 25 with the internal bore 15a of inlet port runner 15. As shown most clearly in FIG. 1, an O-ring seal 31 is positioned around the outside of boss 30 to provide a seal between the inlet port runner 15 and the inlet port mounting face 26. The inlet port runner 15 is affixed to the inlet port mounting face 26 by means of bolts (not shown) which extend through holes (not shown) in the flange 15d of runner 15 and matingly engage threaded bores 32a–32d as shown in FIG. 2.

As most clearly shown in FIG. 2, the width W of port 25 is substantially equal to the length L of each of the rotors 22, 23, and 24 (as seen in FIG. 3) which are rotatably mounted in the meter housing 11. Also, the height H of the inlet port 25 approximates the length A of one of the rotor blades 22, 23, 24 (as seen in FIG. 1) so that the area of the port approximately equals the area swept by a rotor during rotation. This arrangement produces reduced velocity and a lower pressure loss through the meter. Also, as shown in FIG.. 2, and most clearly in FIG. 1, the inlet port is curved in its passage between the inlet port mounting face 26 and the housing cavity 21 so as to direct the fluid flow in an efficient manner toward the outer edge of the blade of inlet displacement rotor 22 to provide less turbulence and higher efficiency of fluid flowing through the meter. With the angle of entry and exit optimized as shown, there is a reduction in rotor bearing load and a reduction in slippage during phase transition of the displacement rotors. The center of fluid flow through the meter is shown by centerline A—A. Heretofore, port designs have directed fluid flow either toward the blocking rotor, or to a position between the blocking rotor and the inlet port rotor.

It should also be noted that the shape of the bore 15a of inlet port runner 15 at the face 15b of inlet flange 15c (FIG. 3) is circular in configuration and sized to match the diameter of piping in the fluid delivery system (not shown). Therefore, the distance between the housing inlet port mounting face 26 and the cavity 21 should be minimal, taking into consideration the curving shape of the inlet port, so that the length of inlet runner 15 is maximized to provide for the smoothest transition of port shape from a circular shape at face 15b to a generally rectangular shape as shown in FIG. 2. It should be noted that while the inlet port runner 15 bore 15a at flange 15c would approximate the inner diameter of 2 inch IPS, 3 inch IPS or 4 inch IPS standard pipe sizes in the British system of measurement, they may also be sized to fit standard metric sized pipe.

As with the inlet port 25 and inlet port runner 15, the outlet port 27 is shaped similarly to inlet port 25 in that it is generally rectangular and has as width approximating the width of the meter rotors, and a height approximating the radial dimension of the meter rotors from the bottom of the hub to the distal tip of the blade for reducing velocity and lowering pressure loss. Also, the outlet port curves as it travels from the housing chamber 21 to the outlet port face 28 in order to provide the least turbulent and most efficient flow of fluid through the meter, and resulting in reduced bearing load and a reduction in slippage. Outlet port face 28 is shaped similarly to inlet port face 26 in that it includes a boss 33 extending therearound which is adapted to have an O-ring 34 positioned outwardly thereof to provide a seal between the housing 11 and the outlet runner 16. Also, the outlet runner bore 16a changes its shape in gradual fashion from being generally rectangular at its mating with the housing 11 at flange 16d to being circular at its outlet flange 16c.

The inlet port face 26 and outlet port face 28 are positioned at 90 degree angles to each other, and at 45 degree angles to the vertical in a normal vertical orientation of the meter housing 11. The compact nature of the outer dimensions of housing 11 in FIG. 1 may be contrasted with the dimensions of the housing shown in FIG. 1 in U.S. Pat. No. 3,457,835, issued to the assignee of the instant invention wherein the inlet port and outlet ports have vertical faces and the runners form an integral unchangeable portion of the housing itself. Clearly, the housing shown in FIG. 1 in U.S. Pat. No. 3,457,835 could not be easily operably mounted in the same industrial environment as the combined meter housing and runners shown in FIG. 1 in the instant application. However, the replacement of the meter shown in U.S. Pat. No. 3,457,853 with the meter of the instant application would be easily facilitated by adding to housing 11 a pair of runners having outer flange faces positioned identically to the inlet and outlet ports of the meter housing shown in U.S. Pat. No. 3,457,835 within the scope of the present invention.

Figure 4:
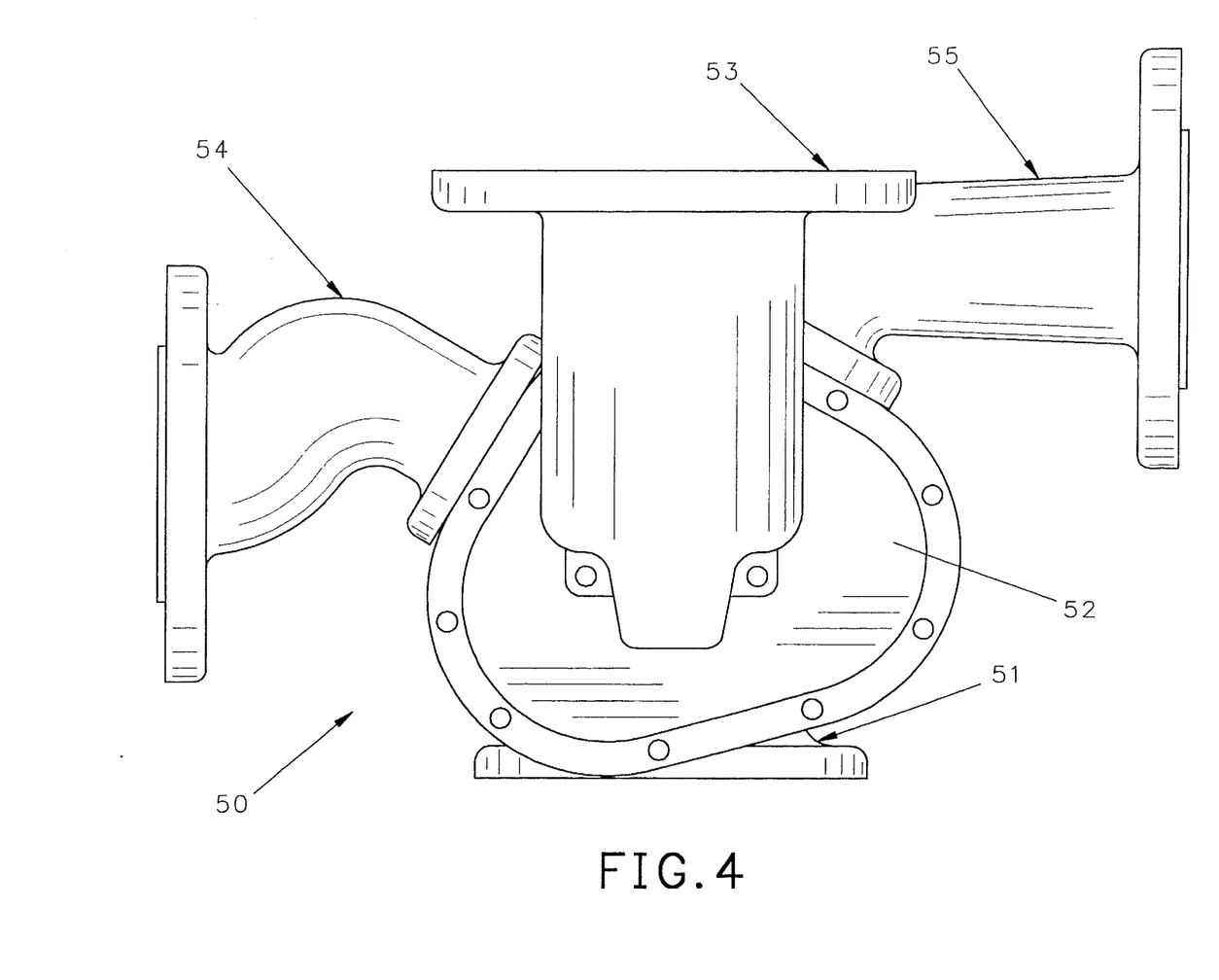
FIG. 4 is a front elevational view of a second embodiment of the combined meter housing with input and output port runners especially made to conform to a specific port configuration together with the front meter end cap and an adjustable meter display mounting therefor.

Referring to FIG. 4, a second embodiment of the instant invention discloses a combination meter housing assembly, generally indicated at 50 including a central housing 51 having a front end cap 52 with a readout display mounting 53 positioned thereon. Display mounting 53 can be mounted or mated to front cap 52 in a number of mounting orientations so that even if the housing 51 is mounted at an angle, with one such orientation shown in FIG. 4, the meter display can still have its output oriented as described. For example, as seen in FIG. 4, front cap 52 is canted at an angle from the horizontal, and display mounting 53 has been rotated with respect to cap 52 to provide a horizontal orientation for the meter display. In the second embodiment 50, the inlet runner 54 differs in shape from the outlet runner 55 because the meter housing assembly is designed to fit in a differing industrial environment, i.e., differing distances and heights between the upstream pipe mounting (not shown) and downstream pipe mounting (not shown) in which the meter housing is to be operably positioned. Because the design of the present meter positions the mounting faces 26 and 28 very close to the meter housing cavity 21, the housing 51 is more compact than any existing competitive industrial meter housing, and the meter housing assembly of the instant invention may be fitted to replace existing competitive industrial type meters. This may be accomplished by making the inlet and outlet runners of any shape necessary to match the inlet and outlet ports of the competitive meter. The instant invention provides greater choices for users of industrial meters, in that they are not restricted to using the meter made by the manufacturer of the original equipment in whatever installation an industrial meter was originally positioned.

Figure 5:
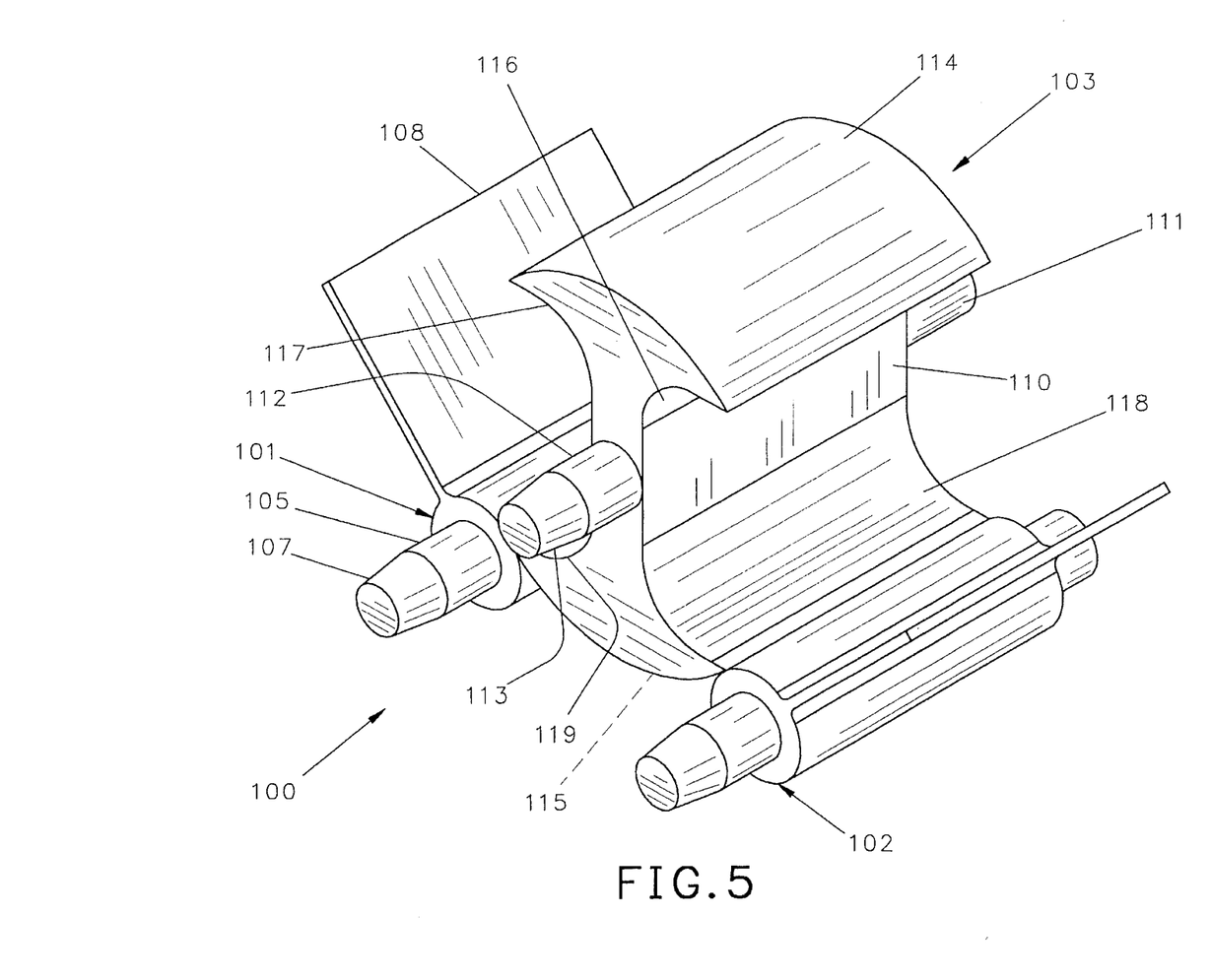
FIG. 5 is a detail perspective view of the displacement and blocking rotors of a third embodiment of the present invention showing the rotors in as-mounted relative positions to each other.
Figure 6:
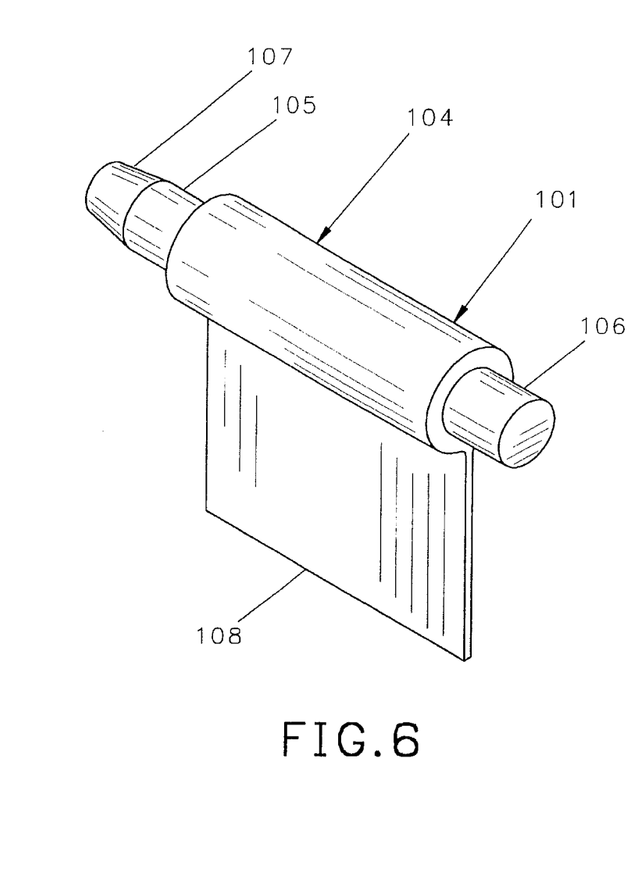
FIG. 6 is a detail perspective view of the displacement rotor shown in FIG. 5.
Figure 7:
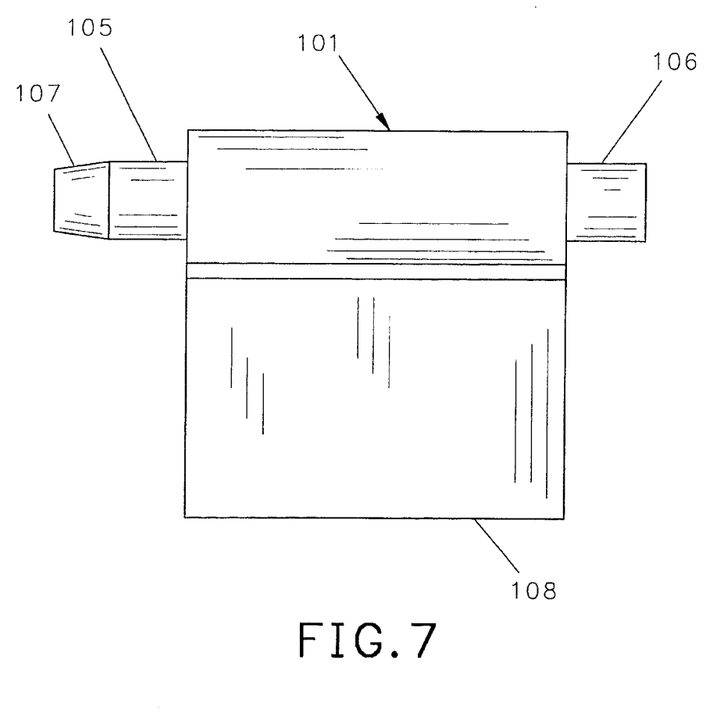
FIG. 7 is a front elevational view of the displacement rotor of FIG. 6 showing a one-to-one width and height correspondence.

Referring to FIGS. 5, 6 and 7, the rotors for a third embodiment of the invention, generally indicated at 100, include a pair of displacement rotors 101 and 102 positioned in spaced parallel axial relation with each other and a blocking rotor 103, also in spaced parallel axial relation above and between the two displacement rotors. As shown most clearly in FIGS. 5 and 6, displacement rotor 101 includes a generally cylindrical base portion 102 having a pair of bearing journals 105, 106 axially mounted at its opposed ends. A frustoconical gear or sheave mounting 107 is positioned distally outwardly of bearing journal 105 for mounting a gear or toothed belt pulley thereon which is used to coordinate the movements of the blocking and displacement rotors.

Referring to FIG. 5, blocking rotor 103 assures one-way fluid flow around displacement rotors 101, 102 and includes a central web portion 110 having opposed bearing journals 111, 112 extending axially from the front and rear thereof, respectively. A frustoconical gear or toothed pulley mounting 113 distally extends from the end of bearing journal 112 similarly to mounting 107 of displacement rotor 101. The periphery of blocking rotor 103 is formed with two diametrically opposed convex cylindrically arcuate surfaces 114, 115 concentric with an axis through web 110 and bearing journals 111, 112. The web 110 and the peripheral surface 114 are connected by opposing concave cylindrical arcuate surfaces 116, 117, and peripheral surface 115 is connected to web 110 by opposing concave cylindrical arcuate surfaces 118, 119. A vertical cross section of blocking rotor 103 resembles the shape of an ancient double edge axe. The shape of the concavity of surfaces 117, 110 and 119 is somewhat defined by the sweep of the distal end 108 of displacement rotor 101.

While an important aspect of the first embodiment 10 of the present invention is the use of displacement rotor blades having a width and vertical height substantially equal to the adjacent inlet or outlet port, the third embodiment of the invention 100 is distinguished by the fact that the displacement rotors have a width which is substantially equal to the height of the displacement rotor, as is shown most clearly in FIG. 7.

In the first embodiment of the invention, the one-to-one correlation between the size of the inlet and outlet ports and the shape of the rotor blade of the displacement rotor increase the efficiency of fluid flow through the meter. Heretofore, positive displacement meters and pumps generally utilized short, wide rectangular shaped rotor blades.

However, when developing a more efficient housing-rotor system for a positive displacement pump or meter, one should take into consideration the fact that pipes having a circular cross section, are utilized in fluid flow partly because a circle has the shape with the most internal area utilizing the least periphery of any two-dimensional geographic shape. Indeed, rotor blades are not circular in axial dimension. However, since displacement rotor blades are rectangular in shape, one can ask what rectangular shape has the most internal area for the least amount of periphery. That is, what shape displacement rotor blade will move the most amount of fluid and have the least amount of boundary effects, i.e., circumferential losses? A square has the most internal area for the least amount of circumference. Therefore, in the third embodiment of the present invention, the displacement rotor blades 101, 102 are designed to have equal height and width dimensions, and are intended to be used in a housing (not shown) that also has substantially identical one-to-one width to height inlet and outlet port dimensions. Further, the housing of the present invention is intended to be utilized with inlet and outlet runners which have a very smooth transition from a circular inlet pipe to the closest sized square in relation to that circle having a substantially identical area. Therefore, for a given inlet pipe size the identical optimum sized square displacement rotor may easily be determined.

Further, in the past, it was thought desirable to minimize the distance from the distal tip 108 of rotor blade 101 to the access of rotation to limit or lessen moment forces on bearings (not shown) mounted between the bearing journals 105, 106 and the meter housing (not shown). However, with changing design in displacement rotors, rotor blades may be made thin and relatively light and still be sturdy enough for extended use. As such, the moment forces around the bearing journals 105, 106 formed by the extended distal end 108 of the rotor blade 101 are not sufficiently greater than heretofore experienced in positive displacement meters or pumps. However, there is an added advantage in that increased ft/min speed at distal end 108 of displacement rotor 101 more efficiently pushes the fluid through the meter than is found with the displacement rotors of the first embodiment. Thus, the one-to-one ratio height/width of the positive displacement rotor blades 101, 102 in the third embodiment 100 of the present invention provide a fluid flow meter or positive displacement pump having superior efficiency of fluid flow through the meter.

While two embodiments of the present invention have been shown and described, it will be apparent to those skilled in the art that additional changes and modifications may be made without departing from the invention in its broader aspects. Therefore, the aim in the appended claims is to cover all such changes and modifications as fall within the true spirit and scope of the invention.

The invention is claimed as follows:

1. In a rotary fluid displacement device of the type having a housing including a fluid flow chamber therein and respective inlet and outlet ports in communication with said flow chamber, and at least one displacement rotor rotatably mounted in said chamber, each said rotor having a rotor hub and at least one rotor blade extending axially along said hub and radially outward from said hub, the areas of each of said respective inlet and outlet ports being substantially equal to an area swept by said hub and one said blade of said displacement rotor, an improvement wherein a width of each of said inlet and said outlet ports is substantially equal to the axially extending dimension of said displacement rotor blade and the cross-sectional height of each of said inlet and said outlet ports is substantially equal to the radially extending dimension from the bottom of said hub to the axially extending edge of said displacement rotor blade.

2. The rotary fluid displacement device as defined in claim 1 wherein:

said axially extending dimension of said displacement rotor blade is substantially equal to said radially extending dimension from the bottom of said hub to the axially extending edge of said displacement rotor blade.

3. The rotary fluid displacement device as defined in claim 1 wherein:

the width of said inlet and outlet ports is substantially equal to the height of said inlet and outlet ports, respectively.

4. In a rotary fluid displacement device of the type having a housing including a fluid flow chamber therein and respective inlet and outlet ports in communication with said flow chamber, and at least one displacement rotor rotatably mounted in said chamber, each said rotor having a rotor hub and at least one rotor blade extending axially along said hub and radially outward from said hub, an improvement comprising an axially extending dimension of said displacement rotor blade being substantially equal to a radially extending dimension of said displacement rotor blade from the bottom of said hub to an axially extending distal edge thereof.

* * * * *